United States Patent
Hall et al.

(10) Patent No.: US 7,690,283 B1
(45) Date of Patent: Apr. 6, 2010

(54) MOTOR MOUNT ASSEMBLY FOR A MILLING TOOL

(75) Inventors: J. Randall Hall, Wadsworth, OH (US); Robert E. Cormany, Barberton, OH (US)

(73) Assignee: H&S Tool, Inc., Wadsworth, OH (US)

( * ) Notice: Subject to any disclaimer, the term of this patent is extended or adjusted under 35 U.S.C. 154(b) by 0 days.

(21) Appl. No.: 12/381,274

(22) Filed: Mar. 10, 2009

(51) Int. Cl.
B23B 3/22 (2006.01)
B23B 5/08 (2006.01)

(52) U.S. Cl. .............................. 82/113; 82/128; 82/131

(58) Field of Classification Search ............... 82/113, 82/128, 131, 136, 905, 147
See application file for complete search history.

(56) References Cited

U.S. PATENT DOCUMENTS

| | | | |
|---|---|---|---|
| 4,236,428 A * | 12/1980 | Feamster, III | 82/128 |
| 4,369,679 A * | 1/1983 | Jones | 82/128 |
| 4,656,898 A * | 4/1987 | Hunt et al. | 82/128 |
| 4,739,685 A | 4/1988 | Ricci | |
| 4,762,038 A | 8/1988 | Olson | |
| 4,791,842 A | 12/1988 | Olson | |
| 4,823,655 A | 4/1989 | VanderPol | |
| 4,939,964 A | 7/1990 | Ricci | |
| 5,054,342 A | 10/1991 | Swiatowy et al. | |
| 5,549,024 A | 8/1996 | Ricci | |
| 5,685,996 A * | 11/1997 | Ricci | 219/121.39 |
| 6,427,567 B1 | 8/2002 | Ricci et al. | |
| D466,132 S * | 11/2002 | Ricci et al. | D15/1 |

OTHER PUBLICATIONS

"*Portable Pipe Lathe, Operations & Maintenance Manual*" Aggressive Equipment, Inc., no date given, Rock Hill, SC 29730, pp. 1-30.
"*Low Clearance Split Frame User's Manual*," E. H. Wachs Company, Lincolnshire, IL, Revision 7, Aug. 2007, pp. 1-124.

* cited by examiner

Primary Examiner—Will Fridie, Jr.
(74) Attorney, Agent, or Firm—Hudak, Shunk & Farine Co. LPA

(57) ABSTRACT

A motor mount assembly for a milling tool, in particular a clamshell lathe, wherein the motor mount assembly has a housing that is secured to a stationary ring of the lathe and a drive gear rotatably journaled in the housing and in operative contact with gearing on a rotatable ring of the lathe that carries a cutting tool. The drive gear is operatively axially supported internally by both the drive shaft of the motor as well as by a portion of the motor mount assembly housing in order to provide a durable, long wearing motor mount assembly.

18 Claims, 4 Drawing Sheets

MOTOR MOUNT ASSEMBLY FOR A MILLING TOOL

FIELD OF THE INVENTION

The present invention relates to a motor mount assembly for a milling tool, in particular a clamshell lathe, wherein the motor mount assembly has a housing that is secured to a stationary ring of the lathe and a drive gear rotatably journaled in the housing and in operative contact with gearing on a rotatable ring of the lathe that carries a cutting tool. The drive gear is operatively axially supported internally by both the drive shaft of the motor as well as by a portion of the motor mount assembly housing in order to provide a durable, long wearing motor mount assembly.

BACKGROUND OF THE INVENTION

Clamshell lathes are known in the art and can be utilized typically in industrial settings to mill a portion of a generally cylindrical pipe or tube. Non-limiting examples of clamshell lathes are disclosed in U.S. Pat. Nos. 4,739,685; 4,939,964; and 5,549,024. Clamshell lathes in some embodiments are designed as annular devices formed from semi-cylindrical halves connected together around a pipe to be milled. A stationary ring of the clamshell lathe is temporarily fixed to the pipe. A rotatable ring is operatively connected to the stationary ring and is rotatable for example by an air, hydraulic, or electrically-operated motor operatively connected to the rotatable ring. In some embodiments, the motor has a motor mount assembly having a housing that is connected to the stationary ring. The motor mount assembly has a drive gear that engages gearing located on the rotatable ring. A tool slide can be mounted on the rotatable ring and is adapted to hold a cutting tool for milling the pipe. The tool slide can include a feed mechanism that advances the tool slide and thus the cutting tool preferably in a radial direction toward the pipe in incremental steps upon a predetermined revolution of the ring gear.

The motor mount assemblies used in the prior art to connect the motor to the lathe are typically connected to the outside diameter of the stationary ring. Such motor mount assemblies have been designed having a plurality of structural arrangements. Some arrangements of motor mount assemblies utilize a drive gear journaled for rotation in the housing that is connected to a drive shaft of the drive motor.

Examples of motor mount assemblies are set forth in the following patents.

U.S. Design Pat. D466,132 relates to an ornamental design for a drive motor mount for a clamshell lathe.

U.S. Pat. No. 4,762,038 relates to a pipe machining apparatus having a tool carrier rotatable about a frame mounted externally of a pipe, with the frame being formed of two semi-annular sections which are releasably held together by connection devices including co-acting pin and latch structures.

U.S. Pat. No. 4,823,655 relates to a multi-speed drive system for a portable lathe, wherein two or more input drive gears are utilized to drive a cutting tool holder ring. Each of the input drive gears has a different pitch diameter so that it will reportedly impart different drive speeds/torque characteristics to the cutting tool holder ring. A main drive gear is interposed between each of the input drive gears and a ring gear attached to the cutting tool holder. The input drive gears are each engaged with the main drive gear and a drive motor is connected to the desired input drive gear.

U.S. Pat. No. 4,939,964 relates to a portable machining lathe having a stationary member interconnected with a gear housing which covers a rotating gear member. A circular race member is connected to the gear member and held in place by means of a plurality of roller bearings. A tool module having a tool bit machines the work piece and automatically advances longitudinally along the work piece by means of an advance mechanism.

U.S. Pat. No. 5,054,342 relates to a pipe machining apparatus that includes a tool carrier with a frame attachable to a pipe for rotatably mounting the tool carrier. The tool carrier is circumferentially rotatable about the pipe and carries a tool for performing cutting or machining operations on the pipe. A plurality of rotatable bearings are provided between the frame and the tool carrier, and the bearings are reportedly individually adjustable in a radial direction to compensate for wear of the bearings during use of the apparatus.

U.S. Pat. No. 5,549,024 relates to a clamshell machining lathe for cutting and finishing pipes in industrial settings comprising a split-ring assembly, including a clamping ring that is positioned about the pipe, and journaled to the clamping ring is a rotatable gear ring that supports a tool block carrying a cutting tool.

U.S. Pat. No. 6,427,567 relates to a motor mount for attaching a drive motor to a clamshell lathe including a gear box whose angular disposition reportedly can be adjusted relative to a drive gear housing affixed to the periphery of the clamshell lathe. This reportedly facilitates the positioning of the clamshell lathe on a workpiece with reduced chance of interference of the drive motor with neighboring obstructions.

SUMMARY OF THE INVENTION

In view of the above, it would be desirable to provide a clamshell lathe with a motor mount assembly that can be quickly and easily connected to both the clamshell lathe as well as a drive motor.

One object of the invention is to provide a motor mount assembly with a desirable construction that is durable and has a long wearing drive gear.

Another object of the invention is to provide a motor mount assembly with a drive gear that is internally supported at both ends in relation to a central rotational axis in order to minimize lateral movement of the drive gear.

Yet another object of the invention is to provide a compact, space saving motor mount assembly having a drive gear comprising a bore or aperture located at the end of the gear comprising gear teeth, wherein a bearing is located in the aperture, the bearing having an aperture that receives a projection present on an inner surface of the cover the housing, whereby the drive gear is rotatably supported by the housing.

Still another object of the invention is to provide a motor mount assembly with a pair of bearings, wherein one bearing is rotatably connected to the drive shaft of the motor and the second bearing is rotatably connected to an internal portion of the drive gear, whereby both bearings are in contact with a portion of the housing, namely a rim of the body of the housing as well as an end cover of the housing.

A further object of the present invention is to provide the motor mount assembly housing with a bearing seat having a rim that prevents lateral movement of one of the bearings towards the drive gear.

Still another object of the present invention is to provide a motor mount assembly that places minimal stress on a drive shaft of a motor connected thereto, thereby extending the life of the motor by preventing damage to the drive shaft.

Yet another object of the present invention is to provide a motor mount assembly having sealed bearings which are thus shielded from debris that results from the milling operation performed utilizing the clamshell lathe to which the motor mount assembly is attached.

In one aspect of the present invention, a motor mount assembly for a clamshell lathe is disclosed, comprising a drive gear adapted to be connected to a drive shaft of a drive motor and having a rotational axis, a head portion comprising a plurality of gear teeth arranged circumferentially around the rotational axis and adapted for driving gear teeth on a rotatable ring of the clamshell lathe, and a shaft portion connected to the head portion, the head portion having a bore in an end face of the head portion, the shaft portion including a second bore located in an end face of the shaft portion and adapted to receive the drive shaft of the drive motor; and a housing adapted to be connected to a stationary ring of the clamshell lathe, wherein a portion of the drive gear is located in and is operatively rotatable within the housing, the housing having a drive shaft aperture adapted to receive a portion of the drive shaft of the drive motor, and a drive gear aperture that exposes a portion of the gear teeth of the drive gear.

In another aspect of the present invention, a motor mount assembly for a clamshell lathe is disclosed, comprising a drive gear adapted to be connected to a drive shaft of a drive motor and having gear teeth adapted for driving gear teeth on a rotatable ring of the lathe; and a housing adapted to be connected to a stationary ring of the lathe, the housing having a drive shaft aperture adapted to receive the drive shaft of the motor, a drive gear aperture that exposes a portion of the gear teeth of the drive gear, and a projection having a portion internally located in a bore of the drive gear that operatively supports the drive gear, and wherein the drive gear is rotatable about the projection.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
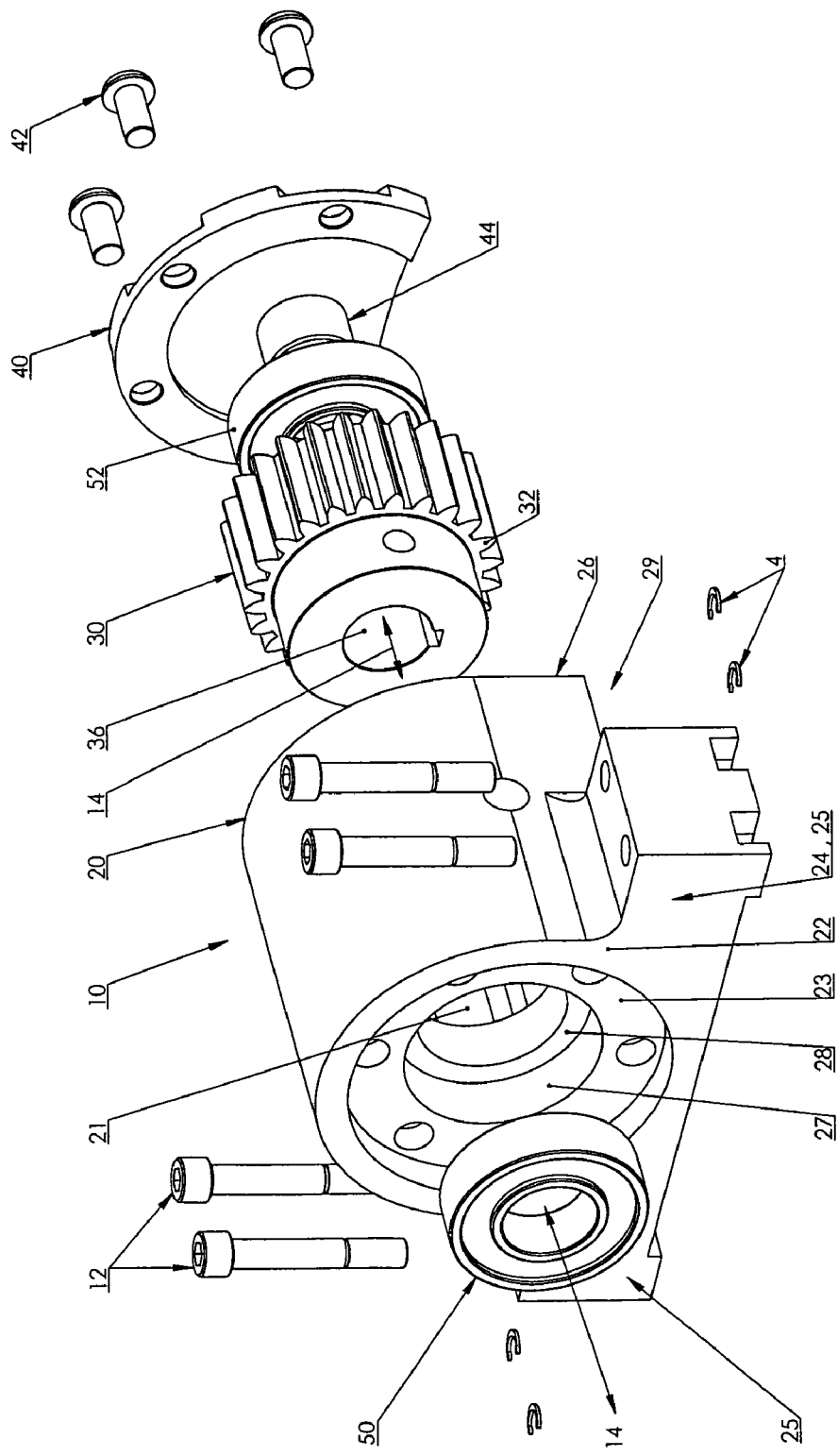
FIG. 1 is an exploded perspective view of one embodiment of a motor mount assembly of the present invention.

One embodiment of a motor mount assembly 10 for a clamshell lathe is illustrated in FIG. 1. The assembly is adapted to be fastened, for example utilizing bolts 12, or otherwise operatively connected to a stationary ring 72 of a clamshell lathe 70, see FIG. 4 for example. A drive motor 60 is operatively connected to a housing 20 of the assembly 10 for driving a drive gear 30 that is used to rotate a rotatable ring 74 of the clamshell lathe 70, see FIGS. 3 and 4.

Figure 3:
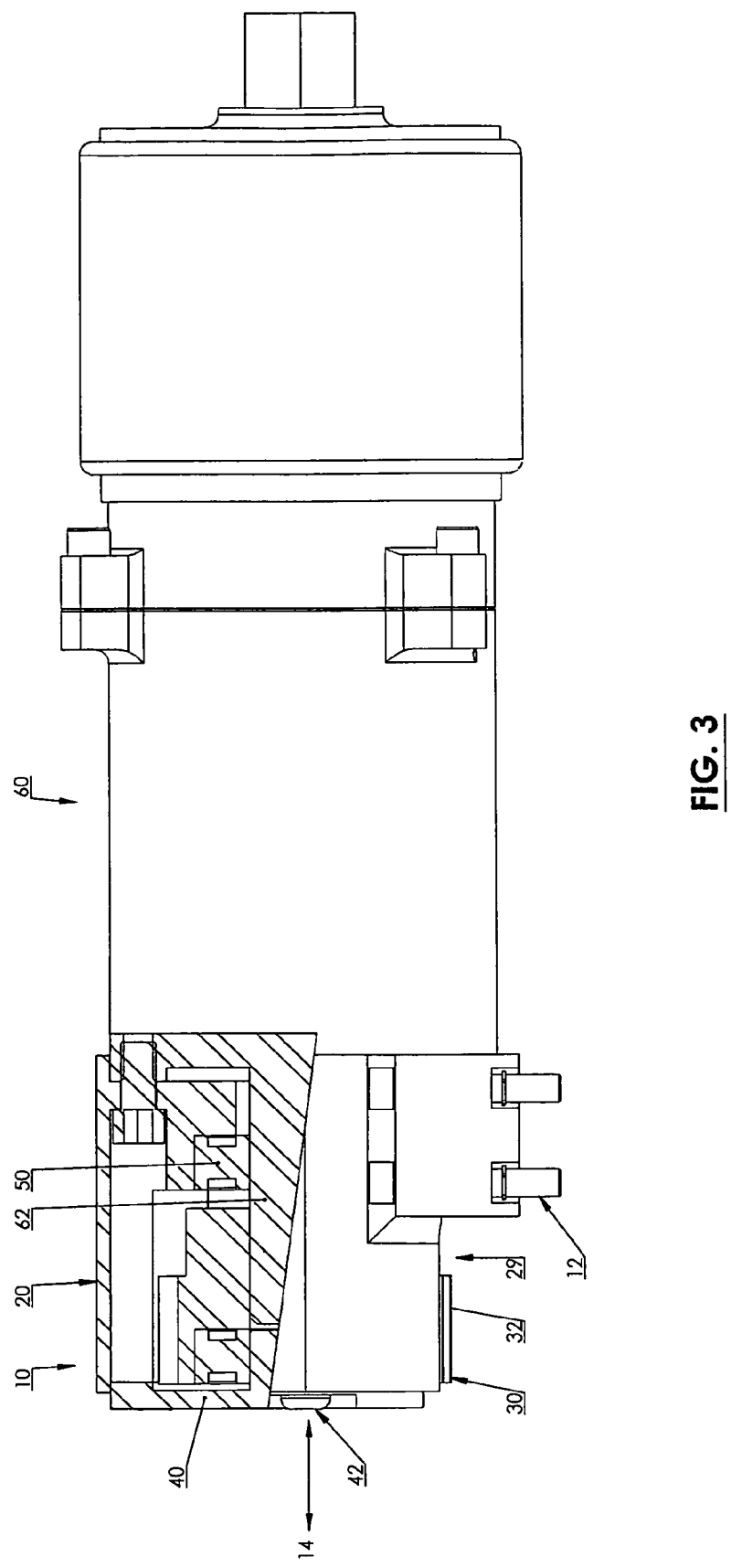
FIG. 3 is a side elevational view of one embodiment of the motor mount assembly of the present invention connected to a motor.
Figure 4:
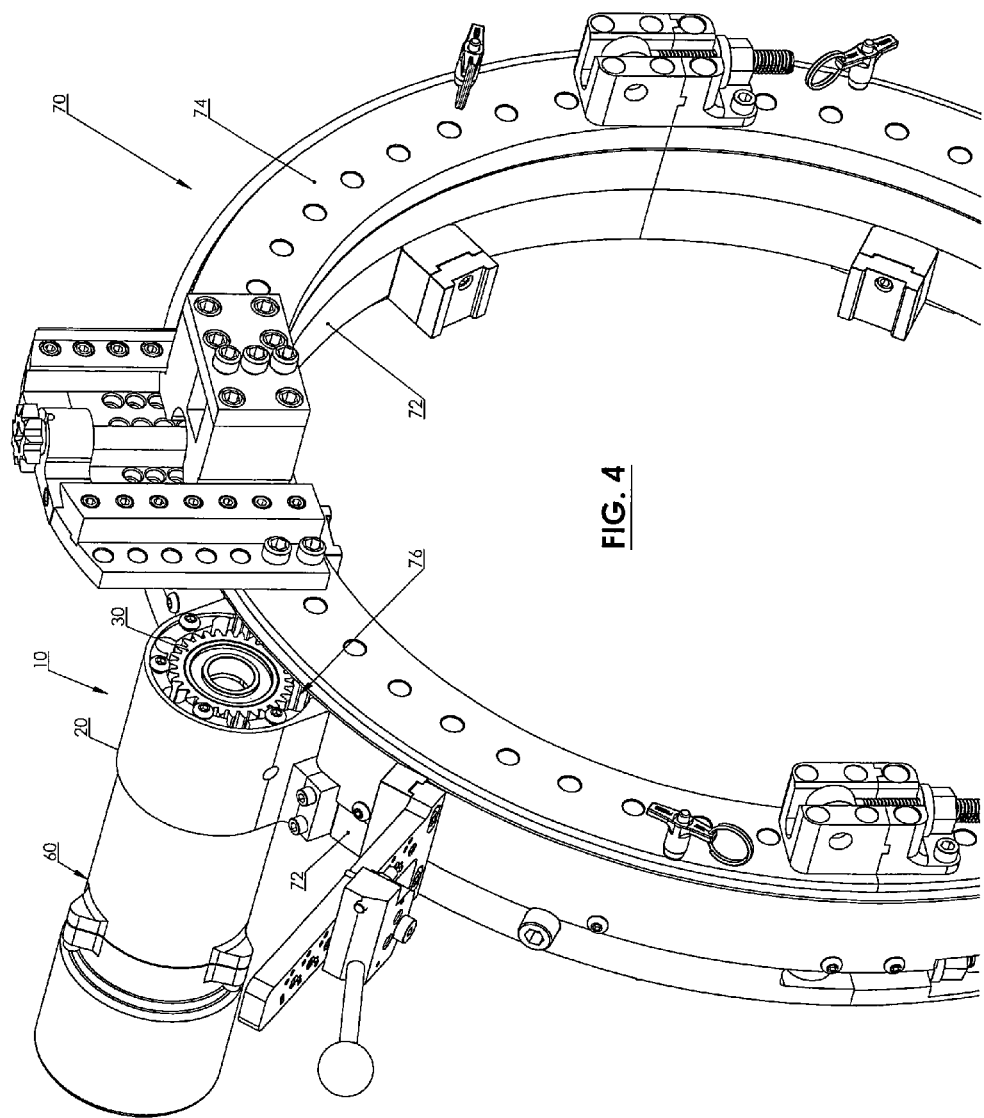
FIG. 4 is a perspective view of one embodiment of the present invention illustrating the motor mount assembly operatively connected to a clamshell lathe.

Motor mount housing 20 has a main body portion having a generally cylindrical shape that houses the drive gear 30, wherein an axis 14, generally a rotational axis of the drive gear 30 and drive shaft 62 of the drive motor, see FIG. 3, extends through the housing 20, see FIG. 1. Housing 20 has a first end 22 that includes an aperture 23 through which the drive shaft 62 of the motor 60 is adapted to extend. The housing 20 is provided with a base 24 having one or more flanges 25 that preferably include at least one aperture through which bolt 12 can be extended in order to allow the motor mount assembly 10 to be secured to the stationary ring 72 of the clamshell lathe 20, such as shown in FIG. 4. In one embodiment, the bottom surface of base 24 is substantially planar, such as shown in FIG. 1. In one embodiment, base 24 can be provided with one or more keys or key slots which cooperate with the corresponding opposite features on the stationary ring 72 in order to provide accurate alignment of the motor mount assembly 10 on the stationary ring 72 of clamshell lathe 70.

The housing 20 has a second end 26, generally opposite first end 22 along the axis 14, to which end cover 40 is connected. The end cover 40 allows access to the inside of the housing 20, provides protection to the components located within the housing 20, and provides support to the drive gear 30, as well as the drive shaft 62, as further explained herein. A suitable fastener, such as button socket head cap screws 42 can be used to secure the cover 40 to the second end 26 of housing 20.

In one embodiment, the housing inner surface 21 is provided with an annular seat 27 for a bearing 50, preferably a roller bearing through which a portion of the motor drive shaft extends. The seat 27 is preferably formed comprising a rim 28 that prevents lateral movement of the bearing 50 along the axis 14 towards the second end 26 of the housing 20 and drive gear 30. Rim 28 is thus a feature, in a preferred embodiment an annular ring, that has a portion, preferably diameter, smaller than the maximum diameter of bearing 50, thereby maintaining the bearing 50 in the housing chamber located towards the first end 22 of housing 20. The outer diameter of bearing 50 is preferably journaled in bearing seat 27 and one side of the bearing 50 preferably contacts seat rim 28.

Housing 20 also includes a window or opening 29 near the second end 26, see especially FIG. 3, which allows the drive gear 30 to be connected to or meshed with the gearing 76 on the rotating ring 74 of the clamshell lathe 70. The periphery of the opening 29 preferably abuts the rotating ring cover in order to prevent debris such as chips or shavings that result from the milling operation performed on a workpiece with the clamshell lathe from entering the motor mount assembly 10.

Figure 2B:
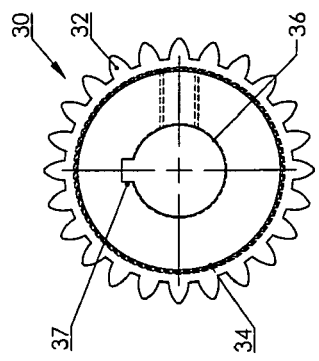
FIG. 2B is a front elevational view of the bearing illustrated in FIG. 2.
Figure 2A:
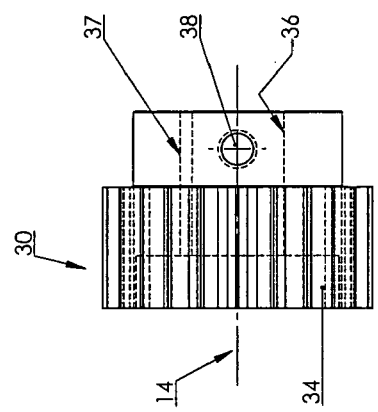
FIG. 2A is a side elevational view of the drive gear illustrated in FIG. 2.
Figure 2:
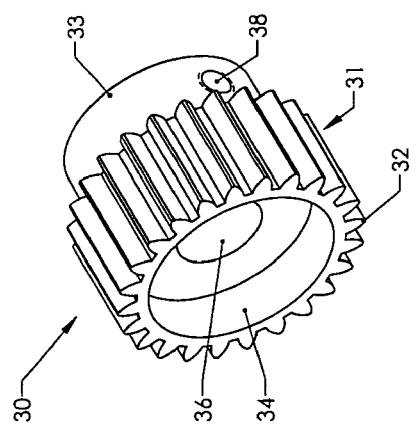
FIG. 2 is a perspective view of one embodiment of the drive gear of the present invention, particularly illustrating an aperture for a drive shaft of a motor for driving the motor assembly as well as an aperture in which a bearing is mountable.

One embodiment of drive gear 30 is illustrated in FIGS. 2, 2A and 2B. Drive gear head portion 31 has a plurality of teeth 32 connectable with the gearing located on the rotating ring of the clamshell lathe. Drive gear head portion 31 also includes a first bore 34 in which drive gear bearing 52 is journaled.

The depth of bore 34 is preferably sufficient to fit the width of bearing 52. In one embodiment, bearing 52 is located within drive gear 30, such that the front face of the drive gear 30 is flush with the face of bearing 52, i.e., the bearing does not project outwardly from the front face of the bore of drive gear 30. The depth of the bore 34 can vary and generally ranges from about 40% to about 60% and preferably from about 35% to about 55% of the width of gear teeth 32 measured along the axis 14. Drive gear 30 also has a shaft portion 33 provided with a second bore 36 for receiving an appropriate drive shaft of the drive motor. Second bore 36 preferably includes a key slot 37, see FIG. 2B, that mates with a key present on a drive shaft of the motor. The shaft portion 33 is preferably provided with a set screw aperture 38 that can receive a set screw that fixedly connects the drive shaft 62 and drive gear 30. Therefore, it can be understood that the drive motor is adapted to rotate the rotatable ring of the stationary ring through the gear assembly provided by connecting the drive shaft of the motor to drive gear 30. The diameter of bore 36 in relation to central axis 14 can vary such that the drive shaft to the motor is able to operatively rotate the drive gear 30.

In one embodiment as illustrated in FIG. 2, first bore 34 and second bore 36 are in communication with each other and, therefore, an aperture extends completely through drive gear 30 along axis 14. However, it is to be understood that first bore 34 and second bore 36 may be separated if desired. The outer diameter of the shaft portion 33 is preferably less than the head portion 31 of the drive gear 30 in one embodiment. The outer diameter of the shaft portion 31 of drive gear 30 is less than the inner diameter of rim 28 in one embodiment.

As illustrated in FIG. 1, the end cover 40 of housing 20 includes a projection 44 on an inner surface thereof that operatively supports the drive gear 30. Preferably, projection 44 is an annular ring or cylinder having an outer diameter that mates with the inner diameter of bearing 52. Bearing 52 is operatively located within drive gear 30, and drive gear 30 operatively rotates around projection 44 and is supported thereby. The axial support provided by the projection 44 for drive gear 30 prevents the head portion 31 of drive gear 30 from sagging or deformation and provides for longer life and less wear, for both drive gear 30 as well as drive shaft 62. Also, less movement of the end of the drive gear 30 including the teeth 32 is realized. The height or length of projection 44 measured in relation to axis 14 is sufficient to provide the desired amount of support for drive gear 30 through bearing 52. In a preferred embodiment, the maximum length of projection 44 measured parallel to axis 14 is about 50% to about 150% of the axial length of bearing 52. The length of projection 44 measured parallel to axis 14 is preferably the same as the axial length of bearing 52 Also, it is important that projection 44 does not contact the drive shaft of the motor.

In view of the constructions described herein, it is illustrated that drive gear 30 is internally supported at both ends in relation to the central rotational axis 14, thereby minimizing lateral movement of the drive gear 30 and drive shaft 62. At the head portion 31 of the drive gear, the drive gear 30 is internally supported by projection 44 of end portion cover 40 through bearing 52. The shaft portion 33 of drive gear 30 is internally supported by a drive shaft of the motor, with the drive shaft additionally being supported by housing 20 through bearing 50.

The bearings provided in the present invention are compact and save space by providing the drive gear 30 with internal connection and support resulting in durability and extended life of the drive gear and drive shaft. The bearings utilized are preferably sealed so that the internal components thereof are shielded from debris that can result during the milling process utilizing the clamshell lathe.

The motor mount assembly of the present invention can be utilized in one embodiment as follows. A drive shaft 62 of the motor 60 that is utilized in connection with the motor mount assembly 10 is inserted through bearing 50 as well as through drive shaft aperture 23. The motor is secured to housing 20 preferably utilizing one or more fasteners, see FIG. 3 for example. Drive gear 30 is operatively connected to the end portion of the drive shaft 62 by inserting the drive shaft 62 in second bore 36 of drive gear 30. A set screw is preferably provided in set screw aperture 38 and tightened against drive shaft 62 that fixedly connects drive gear 30 thereto. Thereafter, end cover 40 is fastened to housing 20 utilizing screws 42 whereby a portion of projection 44 and bearing 52 are located within the first bore 34 of drive gear 30. Housing 20 is secured to the stationary ring of the clamshell lathe either prior to or after the motor and drive gear are interconnected. The teeth 32 of drive gear 30 are meshed with the gearing 76 on the rotatable ring 74 of the clamshell lathe 70. Motor 60 can operate as desired in order to rotate the rotatable ring 74 of clamshell lathe 70 through motor mount assembly 10.

While in accordance with the patent statutes the best mode and preferred embodiment have been set forth, the scope of the invention is not intended to be limited thereto, but only by the scope of the attached claims.

What is claimed is:

1. A motor mount assembly for a clamshell lathe, comprising:

a drive gear adapted to be connected to a drive shaft of a drive motor and having a rotational axis, a head portion comprising a plurality of gear teeth arranged circumferentially around the rotational axis and adapted for driving gear teeth on a rotatable ring of the clamshell lathe, and a shaft portion connected to the head portion, the head portion having a bore in an end face of the head portion, the shaft portion including a second bore located in an end face of the shaft portion and adapted to receive the drive shaft of the drive motor; and a housing adapted to be connected to a stationary ring of the clamshell lathe, wherein a portion of the drive gear is located in and is operatively rotatable within the housing, the housing having a drive shaft aperture adapted to receive a portion of the drive shaft of the drive motor, and a drive gear aperture that exposes a portion of the gear teeth of the drive gear.

2. The motor mount assembly according to claim 1, wherein the housing includes a projection that has a portion located within the bore of the head portion of the drive gear and operatively supports the drive gear.

3. The motor mount assembly according to claim 2, wherein the housing includes an end cover, wherein the end cover includes the projection, and wherein a bearing is interposed between the projection and the bore of the drive gear head portion, wherein the drive gear is rotatable about the bearing.

4. The motor mount assembly according to claim 3, wherein the projection is a substantially annular member, wherein the inner diameter of the bearing is in contact with an outer diameter of the annular projection, and wherein an outer diameter of the bearing is in contact with the head portion bore of the drive gear.

5. The motor mount assembly according to claim 1, wherein the head portion bore has a larger diameter than the shaft portion bore.

6. The motor mount assembly according to claim 1, wherein the shaft portion bore has a key slot for accepting a key of the motor drive shaft.

7. The motor mount assembly according to claim 1, wherein the housing has a bearing seat having a diameter smaller than a diameter of a housing drive shaft bearing, and wherein the housing drive shaft bearing is operatively connected to the bearing seat.

8. The motor mount assembly according to claim 7, wherein the bearing seat has a rim that prevents lateral movement of the drive shaft bearing along the axis towards the drive gear.

9. The motor mount assembly according to claim 8, wherein the bearing seat rim has a diameter less than the diameter of the bearing seat.

10. The motor mount assembly according to claim 9, wherein the housing includes a projection that has a portion located within the bore of the head portion of the drive gear and operatively supports the drive gear, wherein a bearing is interposed between the projection and the bore of the drive gear, and wherein the bearing is located within the bore of the drive gear so that the drive gear is supported by and rotatable around the projection.

11. The motor mount assembly according to claim 10, wherein the housing includes a removable cover, and wherein the projection is located on an inner surface of the cover.

12. The motor mount assembly according to claim 11, wherein the projection is substantially an annular member, wherein an inner diameter of the bearing is in contact with an outer diameter of the annular projection, and wherein an outer diameter of the bearing is in contact with the bore of the drive gear.

13. A motor mount assembly for a clamshell lathe, comprising:

a drive gear adapted to be connected to a drive shaft of a drive motor and having gear teeth adapted for driving gear teeth on a rotatable ring of the lathe; and a housing adapted to be connected to a stationary ring of the lathe, the housing having a drive shaft aperture adapted to receive the drive shaft of the motor, a drive gear aperture that exposes a portion of the gear teeth of the drive gear, and a projection having a portion internally located in a bore of the drive gear that operatively supports the drive gear, and wherein the drive gear is rotatable about the projection.

14. The motor mount assembly according to claim 13, wherein the housing includes an end cover, wherein the end cover includes the projection, and wherein a bearing is interposed between the projection and the bore of the drive gear head portion, wherein the drive gear is rotatable about the bearing.

15. The motor mount assembly according to claim 14, wherein the projection is a substantially annular member, wherein the inner diameter of the bearing is in contact with an outer diameter of the annular projection, and wherein an outer diameter of the bearing is in contact with the head portion bore of the drive gear.

16. The motor mount assembly according to claim 14, wherein the drive gear has a rotational axis, wherein a head portion of the drive gear includes the gear teeth arranged circumferentially around the rotational axis, and wherein the drive gear has a shaft portion connected to the head portion that includes a bore that is operatively connected to the drive shaft of the drive motor.

17. The motor mount assembly according to claim 13, wherein the housing has a bearing seat having a diameter smaller than a diameter of a housing drive shaft bearing, and wherein the housing drive shaft bearing is operatively connected to the bearing seat.

18. The motor mount assembly according to claim 17, wherein the bearing seat has a rim that prevents lateral movement of the drive shaft bearing along the axis towards the drive gear.

* * * * *